3,513,451
DIGITAL INFORMATION STORES

Howard Anthony Dorey and Peter R. Lowe, Farnborough, England, assignors to The Solartron Electronic Group Ltd., Victoria, Farnborough, England, a corporation of the United Kingdom Filed Jan. 17, 1967, Ser. No. 609,839
Claims priority, application Great Britain, Jan. 28, 1966, 3,984/66
Int. Cl. G11c *11/04, 17/00*
U.S. Cl. 340—174 24 Claims

ABSTRACT OF THE DISCLOSURE

A permanent or temporary digital information store having a stack of planar members made from magnetic material, and a number of wires which are looped, or not looped by the planar members in dependence on, the address of information stored by the member, and in some instances, on the information stored. The planar members may be cards of magnetic material which are adapted to be easily shaped according to the address and, in some instances, information stored. Planar members of one type can be selected for read-out by saturating all members but one and changing the flux in all members, only the unsaturated member inducing currents in output wires looped by that member. Planar members of another type have their magnetic states changed for read-out, in this instance one wire carrying some of the current required to change the state is looped by all members, but only one member is looped by the combination of wires carrying the remaining current for read-out.

Figure 1:
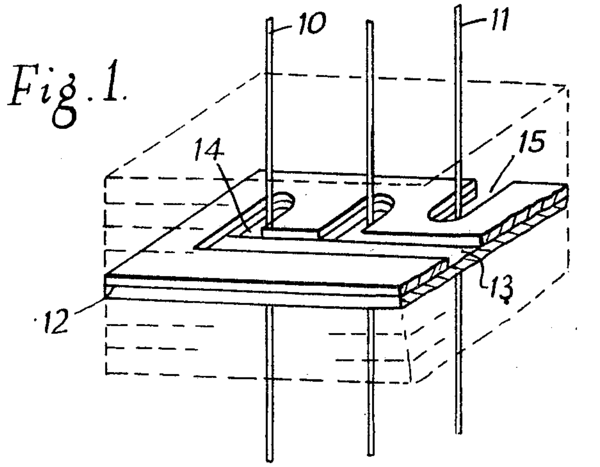

The present invention relates to digital information stores, and stores which are a combination of permanent and temporary stores.

In permanent stores the information held depends on the construction of the store, but in temporary stores information can be entered into the store electrically. Both types of stores have a number of interrogation circuits and a number of output or response circuits. Temporary stores also have "write" circuits which are used to enter information into the stores. Usually "write" pulses are passed to a combination of "write" circuits, and the magnetic states of magnetic elements corresponding to the combination of write circuits are altered.

In both types of store information is read out by exciting a combination of interrogation circuits, the combination representing the address of the word of information to be read out. Output pulses are then induced in a combination of output circuits corresponding to the word read out.

Where the pulses supplied to the interrogation circuits correspond to the address or identifying label for the information provided by the output signals, it is often useful to be able to supply an item of information to the store and obtain addresses corresponding to that item. It is a disadvantage of known stores that the functions of the interrogation and response circuits are not interchangeable as they must be if the above mentioned process of obtaining addresses for an item of information is to be carried out.

A difficulty is encountered in making permanent stores, at an economical price, which can be altered easily to change the information stored therein. This is particularly so where the information is to be frequently changed after installation. For instance boards carrying wires and diodes are sometimes used to store information and it is often necessary to strip a board almost completely to change one "word," that is item of information, stored.

As an example of the desirability of being able to change stored information an apparatus may have a number of alarm conditions a combination of which indicates that it is not working correctly. Signals representative of the alarm conditions may be passed to the permanent store, and if in the correct combination give an alarm, and stop or alter the mode of working of the apparatus. In the light of experience it may however be necessary or desirable to alter the combinations of the alarm conditions giving rise to alterations in the mode of working. This can best be carried out by changing the information in the store. It is clearly desirable therefore that such changes should be made easily.

An object of the present invention therefore is to provide a permanent store in which the items of information stored can be changed quickly and accurately.

Another object of the present invention is to provide a permanent store in which the interrogation and response circuits are interchangeable.

Yet another object of the present invention is to provide a temporary store in which one item of information can be read out without other items being destroyed, so that only the one item has to be written back into the store.

Yet another object of the present invention is to provide a store which, while achieving the above objects, is simple and economical to construct.

In its broader aspects the present invention contemplates a digital-information store including a number of interrogation wires, a plurality of member of magnetic material, each looping selected interrogation wires but not others according to the address of a word in the store, and a number of output wires each of which is looped by one or more of the members. There may of course be an additional lamina which does not loop any interrogation wires, for storing a word whose address is composed of digits which are all zero. It will be apparent how such a word can be read out from a later part of the specification.

The word loop in this specification in relation to a lamina and a wire means that the lamina forms a magnetic circuit round the wire, usually without an air gap.

The interrogation output and write wires mentioned in this specification are the parts of the interrogation, output and write circuits also mentioned.

Preferably all the wires pass through apertures in each lamina, the apertures extending to an edge of the card in the case of wires which are not looped and the apertures extending to a common, larger aperture in the lamina in the case of wires which are looped.

The laminae may be formed from blanks of magnetic material having an elongated aperture and a row of smaller apertures parallel to the longitudinal axis of the elongated aperture, and between the elongated aperture and an edge of the blank.

A blank can then be preformed to make an entry blank or card, that is a blank for use in the store, by cutting away parts of the magnetic material to enlarge the smaller apertures until they either extend to the edge of the blank or join the elongated aperture. If the store is composed of a series of vertical interrogation and output wires having the same spacing as the centres of the smaller apertures, and a stack of cards with the wires passing through the smaller apertures, then a wire passing through an aperture which has been enlarged to the edge of a card will not be looped by that card, but a wire passing through an aperture which joins the elongated aperture is looped by the card.

In this specification the word lamina means a thin sheet of material, the words entry blank and card refer to a lamina with or without backing material shaped for use in a store, and a blank means a lamina, with or without backing material, ready for shaping and subsequent use in a store.

The laminae may each be supported by a sheet of backing material, with the smaller apertures extending through the backing material.

A special tool may be provided for cutting away the material of a blank to preform the blank according to an alphabetical or numerical code representing the address and, for a permanent store, the information to be stored by the blank. Such a tool may have a set of jaws which can be set according to the code. The blank is placed between the jaws which are brought together to cut away parts of the blank so that the blank will then loop selected wires only when it is stacked with other blanks in the store.

Digital-information stores, according to the invention, may be used as permanent stores, or temporary stores or a combination of permanent and temporary stores, when the two types of store are included in one store. For permanent store the magnetic material of the laminae is preferably of high incremental permeability and should saturate definitively.

Each card is preformed to represent a stored word, that is to loop certain interrogation wires according to the address of the word, and certain output wires according to the information stored. To read out a stored word currents are passed through the interrogation wires so that all cards except one selected card are saturated, then the magnetic field applied to all cards is varied slightly and output pulses are obtained in the output wires looped by the selected card only.

For temporary stores the magnetic material of the laminae should be material exhibiting a "square" hysteresis loop. Each card in the stack has an additional elongated aperture and a number of additional smaller apertures. The flux distributions of the cards are individually set by passing currents through "write" wires passing through the additional apertures. To read information out, the flux distribution in a selected card is returned to its initial state by passing currents through certain of the interrogation wires and a wire passing through the additional elongated slot. As the flux distribution in the selected card returns to normal current pulses are induced in the wires passing through the additional smaller aperture, these pulses forming a code representing the word read out.

Permanent and temporary stores will be described in more detail below.

The invention will now be described, by way of example, with reference to the accompanying drawings in which:

FIG. 1 shows part of a permanent store according to the invention.

Figure 2:
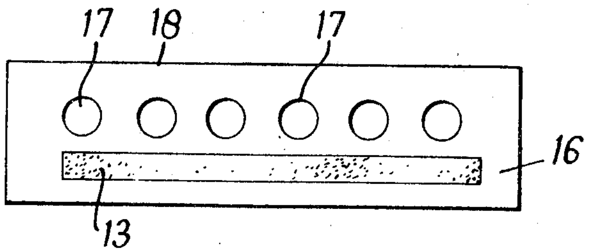
Figure 3:
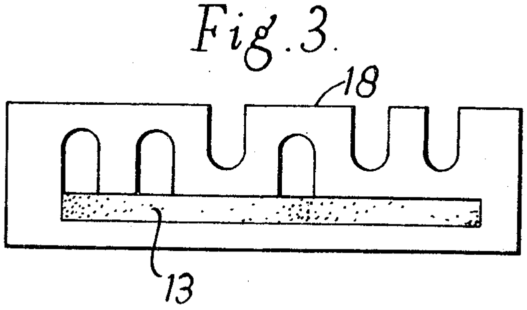
Figure 4:
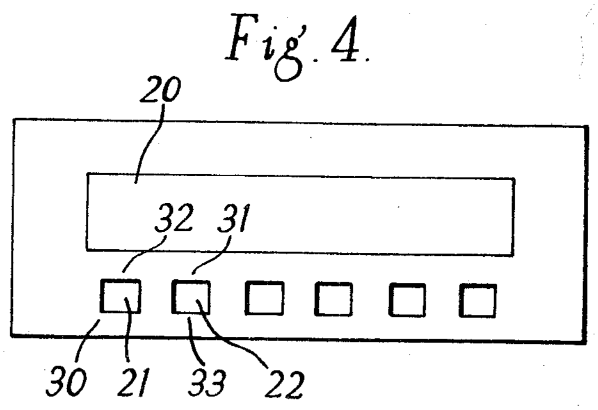
Figure 5:
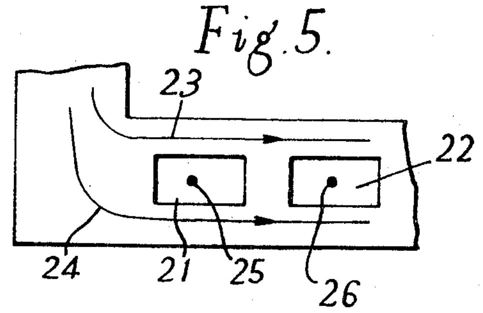
Figure 6:
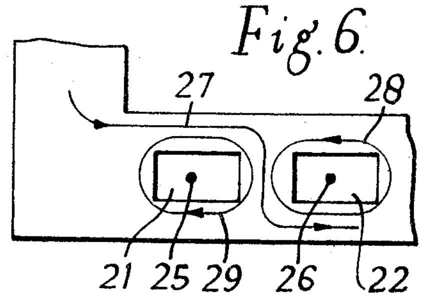
Figure 7:
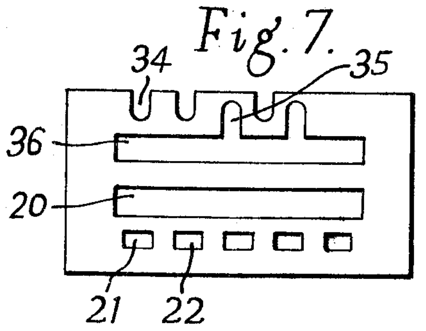

FIG. 2 shows a blank before shaping to represent a word to be stored in a permanent store according to the invention, FIG. 3 shows an entry blank or card formed by shaping a blank, FIG. 4 shows a card used in a known store, FIG. 5 shows one flux distribution in the card of FIG. 4, FIG. 6 shows another flux distribution in the card of FIG. 4, FIG. 7 shows a card for use in a temporary store according to the invention.

Figure 8:
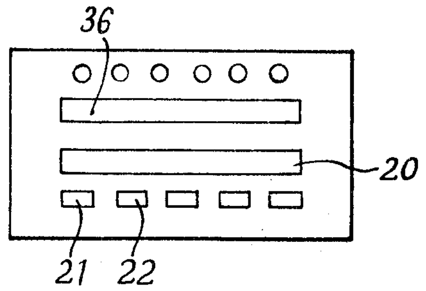
Figure 9:
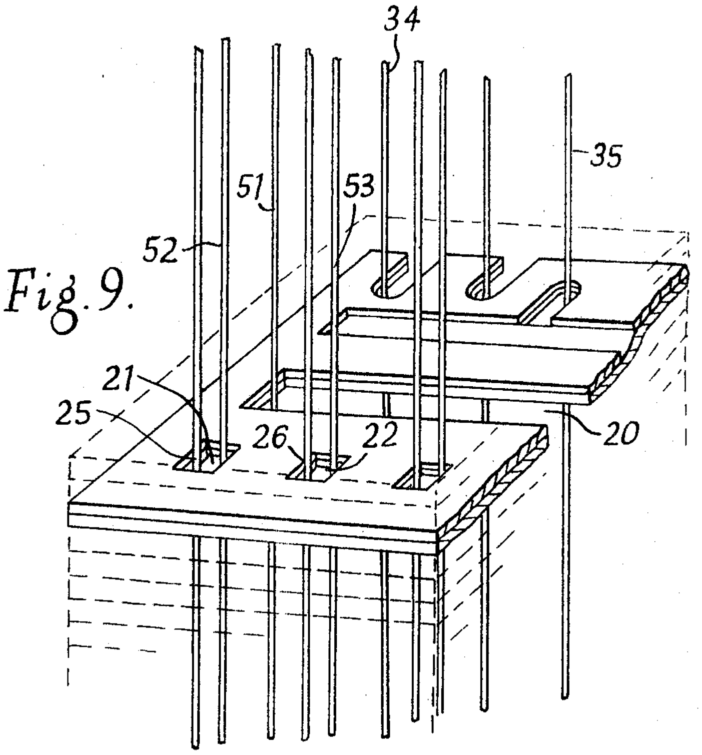
Figure 10:
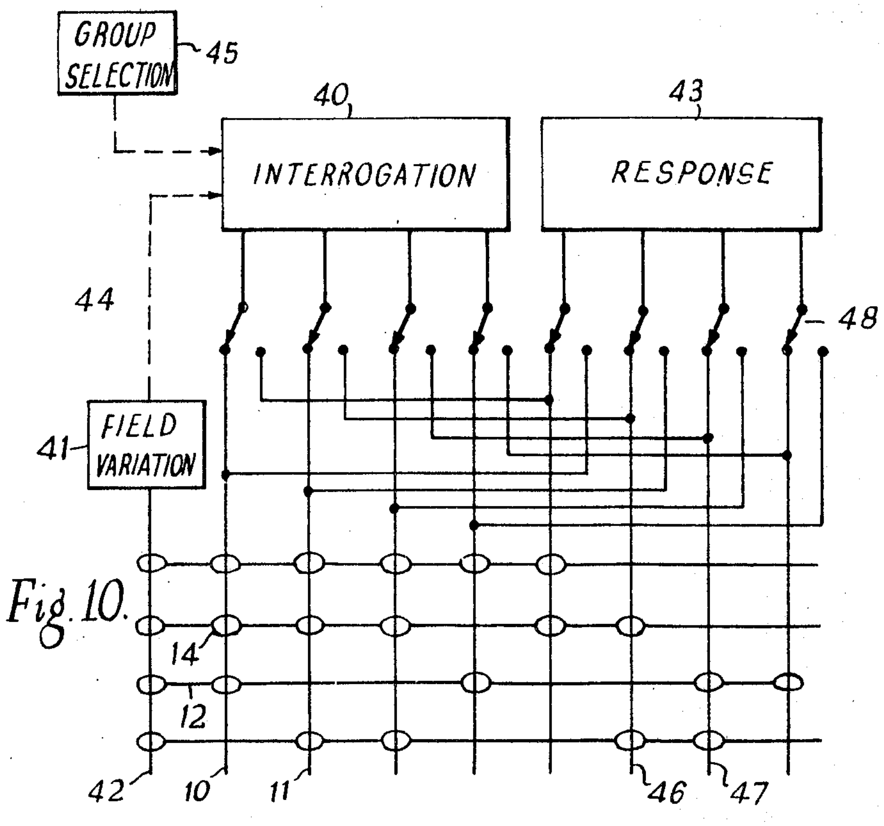
Figure 11:
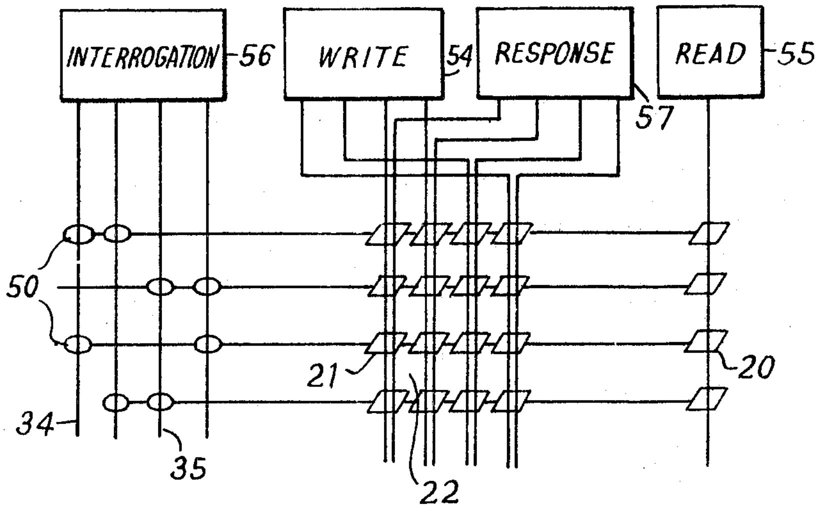

FIG. 8 shows a blank before shaping to represent the address of a word to be stored in a temporary store according to the invention, FIG. 9 shows part of temporary store according to the invention, FIG. 10 is a block diagram of a permanent store according to the invention, and FIG. 11 is a block diagram of a temporary store according to the invention.

A permanent store according to one embodiment of the invention will first be described. Referring to FIG. 1, two wires 10 and 11 are representative of a number of such wires, the remainder not being shown, which are arranged in line in the permanent store. An entry blank or card 12 is also representative of a number of such cards, others of which are shown in phantom, stacked one upon another. The card 12 consists of a lamina of magnetic material and a sheet of backing material, part of which can be seen through an elongated aperture or slot 13 in the lamina of magnetic material. The wire 10 passes through and is looped by the card 12 to 14, while the wire 11 passes through a slot 15 and is not looped by the card. As is exemplified by the wires 10 and 11 the combination of wires looped by the cards of the store varies from card to card.

As illustrated by FIG. 10, the wires represented by wires 10 and 11, can be arbitrarily divided into interrogation wires, and output wires, such as wires 46 and 47, and wires used for interrogation or output at one time may be used at other times for output or interrogation. Thus if it is desired to find the address of a known item of information a combination of output wires can be pulsed, and pulses corresponding to the address of the item of information will be induced in certain interrogation wires.

To enter a word in the store a blank 16 (FIG. 2) is cut away according to the information to be stored and the address of the information in the store, thus the word to be stored is formed. The blank has a number of apertures 17 which pierce both the lamina and its backing material, and the elongated aperture 13. When cutting away parts of the blank, the material between the holes 17 and an edge 18 or the slot 13 is removed. One such blank, which has been shaped by cutting away material, is shown as an entry blank or card in FIG. 3. The shaped card is then added to the stack of cards in the store. The words stored can be easily changed by changing the cards.

The magnetic material used for the blank 16 and the shaped card 12 should have a high incremental permeability and should saturate definitively. "Mumetal" or preferably "Super-Mumetal" are suitable but in a variation of the store "hard" magnetic sheets such as "H.C.R." alloy may, as will be described later, be used. Backing material need not be used, but where it is, a plastics material such as resin-bonded fibre-glass would be suitable. Where backing material is not used some form of magnetic separation, such as an air gap, is required between laminae.

In operation of the store shown partially in FIG. 1, cards representing words of information are first stacked in the store. These cards are shown in FIG. 10, as at 12, and where they loop conductors, for example 10, the holes in the cards are represented by circles as at 14. An interrogation circuit 40 (see FIG. 10) is used to select a card by saturating a part or parts of the magnetic material of all cards except the selected card by passing currents through some wires only, none of these wires being looped by the selected card. For example if there are five interrogation wires, different combinations of three of which are looped by each card, and currents, each of which is sufficient to saturate a card, are passed through two wires then all cards will be saturated except that which loops the wires which are not passing currents.

Having saturated all but one card, this card only has high permeability and when the magnetic field applied to all cards is varied, for example by passing a pulse or a burst of sinusoidal oscillation from a field-variation circuit 41 through an additional wire 42 (see FIG. 10), looped by all cards, output pulses are induced in the output wires of that card only. The output pulses induced in any selected card are received, and if desired decoded in a response circuit 43.

The code used for interrogating the store is therefore a restricted binary code having five bits, being a permutation code, that is a code having fixed numbers of each digit value, for example two ones and three zeros. Instead of the two binary digits being represented by current or no current, they may be represented by two equal but opposite currents. In this case the selected, that is unsaturated, card loops equal but opposite currents, and it is possible to upset temporarily the balance of these currents in order to obtain output pulses, instead of pulsing a wire looped by all cards. To achieve this the field variation circuit 41 is connected to the interrogation circuit 40, by a link 44 (shown schematically in phantom) instead of being connected to the extra wire 42, which can therefore be omitted from this construction. The field-variation circuit 41 now causes currents provided by the interrogation circuit 40 to be a little greater in one direction than the other when read-out is to occur.

Another code which may be used for interrogation is a ternary code, where the digits are represented by zero and equal opposite currents, the currents being distributed according to the code by the interrogation circuit 40.

Where equal opposite currents are used, a group of cards may be addressed by substituting two zeros for a certain positive and negative current combination. A group-selection circuit 45 is shown in FIG. 10 for this purpose.

The output wires of the store may be connected in a series aiding arrangement or in a coded arrangement using aiding and opposing connections. AND gates may be connected preferably by way of amplifiers to the output wires in another arrangement. The AND gates may also be connected by a coded arrangement, using connections in opposite senses, and the output wires connected to each gate may also form a code.

If Super-Mumetal, which can have a ratio of unsaturated to saturated permeability of 20,000:1, is used for the cards it is practicable to address several hundred cards stacked in a single block. Blocks of cards may then be connected together, with or without variations in the combination, that is relative positions and/or numbers, of interrogation wires.

The above suggestions for coding are in nowise intended to be exhaustive. The coding arrangements may be varied at will to suit different applications of the store.

Hard magnetic materials such as H.C.R. alloy which has a "square" hysteresis loop may also be used in a permanent store according to the invention. In this case the selected card is continuously swept from magnetization in one sense to the other sense, by a burst of alternating current, which is passed by the field-variation circuit 41 through the wire 42 looped by all cards. Direct current passed by the interrogation circuit 40 through wires looped by the other cards are saturated, by the direct currents, to such an extent that they remain saturated in one sense throughout the burst of alternating current.

As has been mentioned, it may be desirable, if an item of information is known but not its address in the store, to pass currents selecting the corresponding card through output wires. Thus a number of switches, such as the switch 48 are provided, to switch the interrogation wires, normally connected to the interrogation circuit 40, to the output wires, normally connected to the response circuit 43, and vice versa.

In order to explain a temporary store according to the invention, a known store will first be described with reference to FIGS. 4 to 6. A card of square hysteresis-loop material such as H.C.R. alloy has a longitudinal aperture or slot 20 and a number of smaller slots, for example 21 and 22. The smaller slots are rectangular so that the magnetic paths surrounding them have equal cross sections for a certain defined length.

Each card is first set to one magnetic state by passing a full current of one polarity through a wire threading the slot 20. The flux directions in part of the card is then in the opposite direction to that shown by the arrows 23 and 24 in FIG. 5. A half current, that is a current whose magnitude is half that required to make the material change its magnetic state, of opposite polarity to the full current is then passed through the wire in the slot 20, thus tending to change the magnetic state of the card. The direction of magnetic field due to this half current is shown by the arrows 23 and 24. A word is then entered into the store by passing a combination of half currents, some in one direction some in the other, through write wires such as 25 and 26 passing through the smaller slots. For instance if the half current in the wire 26 is in the same direction as the half current flowing through the slot 20, and the half current in the wire 25 is in the opposite direction, the directions of the magnetic fields due to the half currents flowing in the wires 26 and 25 is shown by the arrows 28 and 29 respectively. The magnetic flux due to the half currents in the wire through the slot 20 and in the wires 26 and 25 is shown by the arrow 27. That is the magnetic state of the paths 32 and 33 (FIG. 4) would change while that of the paths 30 and 31 would be the same. FIG. 4 plus a card of the type shown in FIG. 3. Each card is preformed, for example in the way shown in FIG. 7 to represent the address of the information to be stored by that card. The store has a stack of such cards shown in phantom in FIG. 9 with wires (not shown) passing through the slot 20 and wires 25 and 26 passing through slots such as 21 and 22, respectively. Interrogation wires such as 34 and 35 are looped by some cards but not others, and in FIG. 11 these loops are shown by circles as at 50. A read wire 51 passes through the slot 20, and output wires designated 25, 52 and 26, 53 pass through all such slots as 21 and 22, respectively. In FIG. 11 the slot 20, and the slots such as 21 and 22 are represented by rectangles.

In operation information is entered into the store in the way described in connection with FIGS. 4, 5 and 6 by passing currents from the write circuit 54 and a read circuit 55. To read out the currents passed by an interrogation circuit 56 through wires such as 34 and 35 ensure that in all cards, except one, the net current passed through a slot 36 opposes the current through the slot 20 which tends to set the cards back to their initial state. In the selected card the net current through the slot 36 is in the same direction as that through the slot 20 and this card alone reverts to its initial state. Thus output pulses are induced from the selected card in a response circuit 57, and information stored by the other cards is not destroyed.

Instead of two wires through each of the slots such as 21 and 22 the write wires may also be used as output wires, the write circuit 54 also functioning as a response circuit.

The codes of currents passed through the interrogation, wires can be those already discussed in connection with permanent stores.

Stores according to the invention are expected to be much cheaper than conventional stores, the price per bit eventually reaching one tenth of that for conventional stores. Such stores will be comparatively slow and will probably find their first application in data logging where the rate of exchange of information is not high but the cost of storage is a significant part of the cost of an installation.

In operation information is entered into the store in the way described in connection with FIGS. 4, 5 and 6 by passing currents from a write circuit 54 and a read circuit 55. To read out the currents passed by an interrogation circuit 56 through wires such as 34 and 35 ensure that in all cards, except one, the net current passed through a slot 36 opposes the current through the slot 20 which tends to set the cards back to their initial state. In the selected card the net current through the slot 36 is in the same direction as that through the slot 20 and this card alone reverts to its initial state. Thus output pulses are induced from the selected card in a response circuit 57, and information stored by the other cards is not destroyed.

Instead of two wires through each of the slots such as 21 and 22 the write wires may also be used as output wires, the write circuit 54 also functioning as a response circuit.

The codes of currents passed through the interrogation, wires can be those already discussed in connection with permanent stores.

Stores according to the invention are expected to be much cheaper than conventional stores, the price per bit eventually reaching one-tenth of that for conventional stores. Such stores will be comparatively slow and will probably find their first application in data logging where the rate of exchange of information is not high but the cost of storage is a significant part of the cost of an installation.

We claim:

1. A digital information store, including
a plurality of interrogation wires,
a plurality of output wires,
a plurality of members of magnetic material, each looping selected ones of said interrogation wires and said output wires but not others, to form respective closed and open magnetic paths round each of said wires, according to information stored by said store and the address of said information in said store,
interrogation means for passing currents through one or more selected ones of said interrogation wires to saturate some of said members,
output means coupled to said output wires for indicating when signals are induced therein,
means for applying a varying magnetic field to all of said members, said field varying by an amount which does not cause said saturated members to become unsaturated but which changes the flux density in at least one of said members which has not been saturated whereby information is obtained from the store by inducing output signals in those of said output wires which are looped by said unsaturated member.

2. A store according to claim 1, including
means for coupling said output wires to said interrogation means, and for coupling said interrogation wires to said output means whereby the address of information in the store can be obtained by passing currents from said interrogation means along some of said output wires, selected according to said information.

3. A store according to claim 2, wherein
each of said members is preformed to represent the said information before entry into said store.

4. A store according to claim 3, wherein
said members are laminae, and said laminae are arranged to form a stack,
said interrogation and said output wires passing through said stack.

5. A store according to claim 4, wherein
at least one of said laminae has a comparatively long elongated slot, and a plurality of smaller slots,
at least one of said smaller slots communicating with said elongated slot.

6. A store according to claim 5, wherein
said one laminae has an edge thereto, and at least one of said smaller slots communicates with said edge.

7. A store according to claim 4 wherein said means for applying a varying magnetic field includes
an additional wire which is looped by all of said members, and
means for passing a varying current through said additional wire to vary said magnetic field by an amount which does not cause said saturated members to become unsaturated.

8. A store according to claim 4 wherein
said interrogation means passes at least one pair of equal but opposite currents through said unsaturated member, and
said means for applying a varying magnetic field changes the balance between said currents to induce said output signals.

9. A store according to claim 4 wherein said magnetic material of said members has a "square" hysteresis loop,
said means for applying a varying magnetic field applies a varying magnetic field to said members sufficient to sweep said magnetic material of said unsaturated member through said hysteresis loop, and
said interrogation means saturates said saturated members to such an extent that said magnetic material of said saturated members is not swept through said hysteresis loop.

10. A digital information store including
a plurality of interrogation wires,
a plurality of output wires,
a plurality of sheets of magnetic material which saturates definitively and has high incremental permeability, each of said sheets being preformed before entry into said store to loop selected ones of said interrogation wires and said output wires but not others, to form respective closed and open magnetic paths round each of said wires, according to information stores by said store and the address of said information in said store,
interrogation means for passing currents through some selected interrogation wires to saturate some of said sheets,
output means coupled to said output wires for indicating when signals are induced therein,
an additional wire looped by all of said sheets,
means for passing a varying current through said additional wire to apply a varying magnetic field to said sheets,
said magnetic field not varying sufficiently to cause said saturated sheets to become unsaturated,
said magnetic field changing the flux density in at least one of said sheets which has not been saturated, whereby information is obtained from said store by inducing output signals in those of said output wires which are looped by said unsaturated sheets, and
means for coupling said output wires to said interrogation means, and for coupling said interrogation wires to said output means, whereby said address can be obtained by passing currents from said interrogation means along some of said output wires selected according to said information.

11. A store according to claim 10, wherein said interrogation means includes means for selecting among said interrogation wires to pass currents therethrough according to a permutation binary code, the current conditions in said interrogation wires representing a binary digit in said code, wherein each binary digit is represented by any two of the following: flow of current in one direction, flow of current in an opposite direction, and lack of current flow.

12. A store according to claim 10, wherein said interrogation means includes
means for selecting among said interrogation wires to pass currents therethrough according to a ternary code,
ternary digits in said code being represented by passing a current in one direction, and not passing a current.

13. A store according to claim 10, wherein said interrogation means includes
means for supplying equal and opposite currents in different selected ones of said interrogation wires to select information for read out, and
means for selecting a pair of said interrogation wires which carry equal and opposite currents, and interrupting the currents in said pair whereby the information held by a group of said sheets can be read out.

14. A digital information store, including
a plurality of interrogation wires,
a plurality of output wires,
a plurality of sheets of magnetic material, which saturates definitively and has high incremental permeability, each of said sheets being preformed before entry into said store to loop selected ones of said interrogation wires and said output wires but not others, to form respective closed and open magnetic paths round each of said wires, according to information stores by said store and the address of said information in said store, interrogation means for passing equal but opposite currents through different selected ones of said interrogation wires to saturate some sheets but to pass at least one pair of equal and opposite currents through those of said interrogation wires which loop one selected sheet, said selected sheet remaining unsaturated, means for changing the balance between said equal but opposite currents whereby the flux density of said unsaturated sheet only changes and those of said output wires looped by said unsaturated sheet have signals induced therein, output means coupled to said output wires for indicating when signals are induced therein, and means for coupling said output wires to said interrogation means, and for coupling said interrogation wires to said output means, whereby said address can be obtained by passing currents from said interrogation means along some of said output wires selected according to said information.

15. A store according to claim 14, wherein said interrogation means includes means for selecting among said interrogation wires to pass currents therethrough according to a binary permutation code, the current conditions in said interrogation wires representing a binary digit in said code, the two states of which being selected from any two of the following conditions: passing a current in one direction, passing a current in the other direction, and not passing a current.

16. A store according to claim 14, wherein said interrogation means include means for selecting among said interrogation wires to pass currents therethrough according to a ternary code, ternary digits in said code being represented by passing a current in one direction, passing a current in the other direction, and not passing a current.

17. A store acording to claim 14, wherein said interrogation means includes means for supplying equal and opposite currents in different selected ones of said interrogation wires which carry equal and opposite wires, and interrupting the currents in said pair whereby the information held by a group of said sheets can be read out.

18. A digital information store, including a plurality of interrogation wires a plurality of planar members of magnetic material, having a "square" hysteresis loop, each of said members looping selected ones of said interrogation wires, to form respective closed and open magnetic paths round each of said wires, according to the address of information stores by each said member, each of said members defining, in addition to said closed magnetic path, a comparatively large aperture and a plurality of comparatively small apertures, a number of write wires equal to the number of said small apertures, each of said write wires passing through a separate one of said small apertures, means for passing currents through selected ones of said write wires according to information to be stored in said store, to change the magnetic state of at least part of one of the members, a number of output wires equal to the number of said small apertures, each of said output wires passing through a separate one of said small apertures, a read wire passing through said large slot, means for passing currents through selected ones of said interrogation wires, means for passing current through said read wire, said currents in said interrogation wires and said currents in said read wires maintaining the magnetic state of all of said members except one selected one of said members, said selected member changing its magnetic state and inducing signals in said output wires, and output means coupled to said output wires for indicating when signals are induced therein.

19. A store according to claim 18, wherein said write wires are also used as said output wires.

20. A store according to claim 19 wherein said members are sheets of magnetic material.

21. A store according to claim 20 wherein at least one of said sheets defines an elongated slot and a plurality of smaller slots, in addition to said large and small apertures, at least one of said smaller slots communicating with said elongated slot, and at least one of said smaller slots communicating with an edge of said sheet.

22. A store according to claim 21, wherein said interrogation means includes means for selecting among said interrogation wires to pass currents therethrough according to a binary permutation code, the current conditions in said interrogation wires representing a binary digit in said code, the two states of which being selected from any two of the following conditions: passing a current in one direction, passing a current in the other direction, and not pass ing a current.

23. A store according to claim 21, wherein said interrogation means includes means for selecting among said interrogation wires to pass currents therethrough according to a ternary code, ternary digits in said code being represented by passing a current in one direction, passing a current in the other direction, and not passing a current.

24. A store according to claim 21, wherein said interrogation means includes means for supplying equal and opposite currents in different selected ones of said interrogation wires to select information for read out, and means for selecting a pair of said interrogation wires which carry equal and opposite wires, and interrupting the currents in said pair whereby the information held by a group of said sheets can be read out.

References Cited

UNITED STATES PATENTS

| | | | |
|---|---|---|---|
| 3,234,529 | 2/1966 | Hsueh et al. | 340—174 |
| 3,339,184 | 8/1967 | Pick | 340—174 |
| 3,376,562 | 4/1968 | Newhall et al. | 340—174 |

JAMES W. MOFFITT, Primary Examiner

G. M. HOFFMAN, Assistant Examiner